United States Patent Office 2,942,422
Patented June 28, 1960

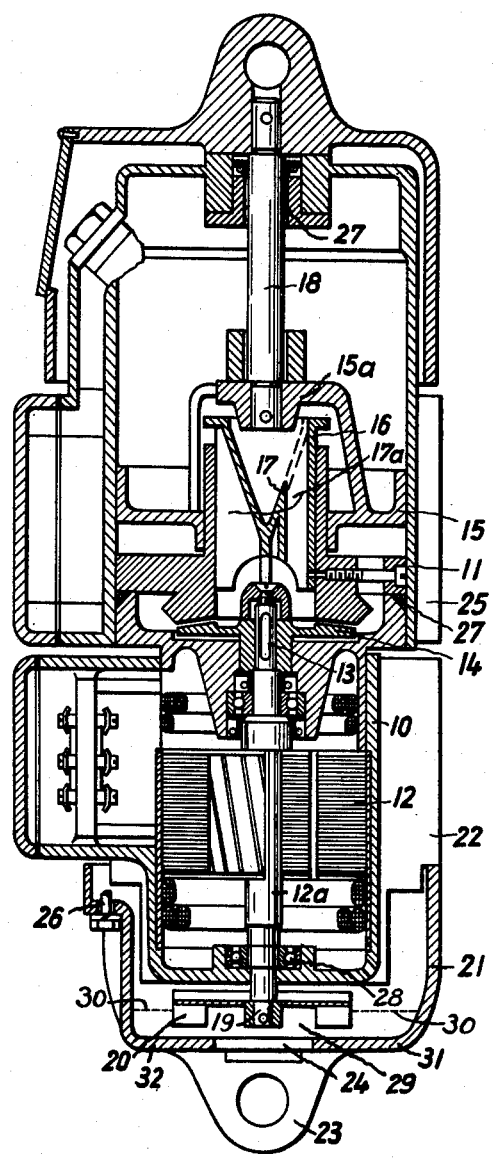

---

2,942,422

ELECTRO-HYDRAULIC ADJUSTING DEVICE

Alfred Weis, Walter Sussebach, and Max Schworer, all of Westphalia, Germany, assignors to Elektro-Mechanik G.m.b.H., Westphalia, Germany Filed July 1, 1959, Ser. No. 824,315

Claims priority, application Germany July 4, 1958

2 Claims. (Cl. 60—52)

---

The present invention relates to an electro-hydraulic adjusting device. More in particular, the present invention relates to an electro-hydraulic adjusting device of the type comprising an electric driving motor, a pump positioned on the shaft of the motor and actuating, via a pressure medium, an adjusting piston.

It is known that valves, slides, and the like have to be displaced in many instances very frequently. It has, therefore, become known to provide an electro-hydraulic adjusting device for displacing such valves and slides and also particularly for lifting brakes. These known electro-hydraulic adjusting devices comprise an electric driving motor with a driving shaft on which latter there is positioned a pump conveying a pressure medium and thereby displacing an adjusting piston. In some of these devices the driving motor, the pump and the adjusting piston are coaxially disposed in the same casing.

Since the adjusting devices of the type just described have to operate at frequent intervals of time and in some uses even continuously for periods of time, it is important to provide for effective cooling. This problem has not been satisfactorily solved in the art. It has been tried to cause an effective heat exchange by enlarging the surface of the casing by providing the same with a plurality of cooling fins. This has proved, however, to be insufficient as in many instances the adjusting device is mounted within a machine at a location which is almost inaccessible or which can be reached only with great difficulty. Consequently, the casing and the cooling fins are soon covered with dirt, grease, oil, dust, and the like, and the heat exchange is greatly reduced, thereby rendering the cooling effect even less effective.

Accordingly, it is an object of the present invention to provide an electro-hydraulic adjusting device in which the cooling is very effective under all operating conditions.

This object is achieved by the present invention. The electro-hydraulic adjusting device of the invention comprises, in addition to the electric driving motor with the pump on its shaft, the adjusting piston and the casing, a ventilator wheel, which latter is mounted on the driving shaft of the electric motor opposite to the end bearing the pump. The ventilator wheel is mounted on the outside of the casing housing the electric driving motor with a pump and the adjusting piston, and it is covered by a cover lid at least partly surrounding, at a certain distance, the casing housing the motor.

According to the invention, the ventilator is driven by the electric motor and produces a stream of air which is radially directed with respect to the driving shaft; this air stream hits the cover lid and is, therefore, deflected so as to flow in an axial direction with respect to the driving shaft and along the cooling fins of the casing and the casing housing the driving motor, the pump and the adjusting piston.

According to a modification of the invention, the cover lid is provided with eyes allowing for a hinged mounting of the entire adjusting device between which eyes there is centrally disposed in the cover lid the inlet opening for air to be conveyed by the ventilator.

The invention will be better understood upon the following detailed description of the accompanying drawing, which is a longitudinal sectional view of an electro-hydraulic adjusting device of the present invention with the aforementioned ventilator and deflecting cover lid arrangement.

Referring now to this drawing more in detail, the electro-hydraulic adjusting device has a casing composed of an upper casing portion 11 and a lower casing portion 10. The casing composed of the casing portions 10 and 11 is provided with a plurality of cooling fins 22 and 25. The lower casing portion 10 houses the electric driving motor 12 having a driving shaft 12a. At the end directed towards casing portion 11, the shaft 12a has a shaft portion 13 projecting into the upper casing portion 11 and supporting pump 14. The upper casing portion 11 furthermore houses the adjusting piston 15 which is of the annular piston type and which is guided through the guide tube 16, which latter simultaneously serves as the suction tube for the pump 14. The guide tube 16 has a plurality of inner walls 17 subdividing the tube into a plurality of chambers 17a so as to prevent a rotation of the hydraulic pressure medium therewithin. The adjusting annular piston 15 has an upper flange 15a in which there is positioned the adjusting piston rod 18 projecting through the casing to the outside through guide sleeves 27 and effecting the displacing movement of the device to be adjusted or the brake to be lifted.

At the end opposite to the pump, the adjusting piston and the piston rod, the driving shaft 12a has a portion 19 guided to the outside of the lower casing portion 10 through a guide bearing 28. This portion 19 of the shaft supports a ventilator wheel 20 which is thus disposed outside of casing portion 10, and of course also outside of casing portion 11. The lower portion of the casing portion 10 is surrounded, at a certain distance, by a cover lid 21. The ventilator wheel 20 is thus disposed in the space formed between the cover lid 21 and the casing portion 10. The cover lid 21 is mounted on the cooling fins 22 with one end, the other end being attached to the casing portion 10 by means of tie bolt 26.

According to a modification of the device of the invention, the cover lid 21 has eyes 23 with which the adjusting device can be hingedly mounted. Furthermore, an air inlet passage 24 is provided between the eyes and centrally disposed in the cover lid, so as to allow for the passage of air sucked into the space between the cover lid and the casing by the ventilator and then conveyed as described further below.

Operation

The pump 14 is driven by electric motor 12 via driving shaft 12a. Thereby, the hydraulic pressure medium in the casing portion 11, for example, oil is sucked towards the pump 14 through the guide tube 16 with the division into a plurality of chambers 17a preventing an undesirable rotation of the pressure medium; the latter then is pressed by pump 14 below piston 15. Thereby, the piston 15 is pushed upwardly and the piston rod 18 is displaced, thus furnishing the desired adjusting operation for the valve, slide, brake etc.

During this operation the adjusting device is cooled in the following manner:

The ventilator wheel mounted on shaft end 19 is rotated by the shaft 12a driven by electric motor 12. Air from the outside is drawn from the outside through inlet 24 into the space 29 between the cover lid 21 and casing portion 10 and is then radially thrust against the cover lid 21, as indicated by the dashed lines 30. Upon hitting against the cover lid 21 the air is then deflected along the curved portions 31, 32, and then along the casing portion 10; the air thus flows in an axial direction with respect to the driving shaft 12a and flows along the casing and the cooling fins 22, 25, of the casing portions 10 and 11, respectively. Thereby, the casing portions 10 and 11 housing the motor, the pump and the piston are cooled very effectively under all operating conditions of the adjusting device.

It will be understood that this invention is susceptible to modification in order to adapt it to different usages and conditions and, accordingly, it is desired to comprehend such modifications within this invention as may fall within the scope of the appended claims.

We claim:

1. Electro-hydraulic adjusting device comprising, in combination, an electric motor, a driving shaft driven by said motor, a pump mounted at one end of said driving shaft, a pressure medium conveyed by said pump, an adjusting piston actuated by said pump via said pressure medium, a casing, a plurality of cooling fins on said casing, said electric motor with said driving shaft and said pump and adjusting piston being disposed coaxially in said casing, a cover lid surrounding at least partially said casing at a predetermined distance so as to create a hollow space between said cover lid and said casing, and a ventilator mounted on said driving shaft opposite to the end bearing said pump and in the space between said casing and said cover lid, said ventilator being driven by said motor via said driving shaft thereby producing a stream of air which is radially directed with respect to said driving shaft towards said cover lid and which is deflected by the latter so as to flow in an axial direction with respect to said driving shaft along said casing and said cooling fins on said casing.

2. Electro-hydraulic adjusting device as described in claim 1, said cover lid having a pair of eyes allowing for the hinged mounting of the device, and between said eyes a centrally disposed air inlet for the air conveyed by said ventilator.

No references cited.